United States Patent [19]

Guest

[11] Patent Number: 4,722,560

[45] Date of Patent: Feb. 2, 1988

[54] QUICK RELEASE TUBE COUPLING

[76] Inventor: John D. Guest, "Iona", Cannon Hill Way, Bray, Maidenhead, Berkshire, United Kingdom

[21] Appl. No.: 5,303

[22] Filed: Jan. 20, 1987

Related U.S. Application Data

[60] Continuation of Ser. No. 780,738, Sep. 27, 1985, abandoned, which is a division of Ser. No. 629,932, Jul. 12, 1984, Pat. No. 4,650,529.

[51] Int. Cl.$^4$ .................... F16L 17/02; F16L 47/02
[52] U.S. Cl. .................... 285/323; 156/73.1; 285/423; 285/286
[58] Field of Search ............... 285/323, 322, 286, 423, 285/21; 156/73.1, 294

[56] References Cited

U.S. PATENT DOCUMENTS

| | | | |
|---|---|---|---|
| 2,776,151 | 1/1957 | Narkenrider | 285/238 |
| 2,933,428 | 4/1960 | Mueller | 156/294 |
| 2,942,748 | 6/1960 | Anderson | 156/294 |
| 3,002,871 | 10/1961 | Tramm et al. | 285/21 |
| 3,516,690 | 6/1970 | Kreig | 285/55 |
| 3,653,689 | 4/1972 | Sapy et al. | 285/322 |
| 3,722,924 | 3/1973 | Bjornsen | 285/55 |
| 3,743,326 | 7/1973 | Courtot et al. | 285/323 |
| 3,963,267 | 6/1976 | Legris | 285/323 |
| 3,980,324 | 9/1976 | Bouteille et al. | 285/323 |
| 3,999,783 | 12/1976 | Legris | 285/323 |
| 4,005,884 | 2/1977 | Drori | 285/323 |
| 4,059,294 | 11/1977 | Fallone | 285/238 |
| 4,140,058 | 2/1979 | Ballreich et al. | 156/73.1 |
| 4,146,254 | 3/1979 | Turner et al. | 285/351 |
| 4,220,361 | 9/1980 | Brandenberg | 285/323 |
| 4,435,101 | 3/1984 | Sugiyama et al. | 156/73.1 |
| 4,573,716 | 3/1986 | Guest | 285/323 |
| 4,588,214 | 5/1986 | Guest | 285/323 |
| 4,606,783 | 8/1986 | Guest | 156/73.1 |

FOREIGN PATENT DOCUMENTS

| | | | |
|---|---|---|---|
| 1520742 | 8/1978 | United Kingdom | 285/323 |
| 1573757 | 8/1980 | United Kingdom | 285/323 |

Primary Examiner—Gary L. Smith
Assistant Examiner—Eric K. Nicholson
Attorney, Agent, or Firm—Beveridge, DeGrandi & Weilacher

[57] ABSTRACT

The disclosure relates to a quick release tube couplings in which a collet with resilient arms is arranged to cooperate with a tapering cam surface in a member surrounding the collet to force the arms to grip a tube within the collet. The member is formed from two, male and female parts each having a bore, the male part bore being tapered to provide the cam surface. The male and female parts are assembled with a pair of annular surfaces on the respective parts spaced apart by an edge or projection on one of the surfaces and ultrasonic vibration is applied to soften the ridge to cause the surfaces to weld together and to allow two other opposed annular surfaces to come together and be welded by said ultrasonic vibration to weld the two parts together at two spaced annular region.

4 Claims, 2 Drawing Figures

QUICK RELEASE TUBE COUPLING

This application is a continuation of application Ser. No. 780,738, filed Sept. 27, 1985, now abandoned, which is a division of application Ser. No. 629,932, filed July 12, 1984, now U.S. Pat. No. 4,650,529.

BACKGROUND OF THE INVENTION

1. Field of the Invention

This invention relates to quick release tube couplings of the kind (referred to hereinafter as the kind described) having a collet with resilient arms arranged to co-operate with a cam surface on a member surrounding the collet, this cam surface being constituted by an internal surface tapering to a smaller diameter in one axial direction and engaging the arms so that the arms are forced radially inwardly by axial movement in this direction which is the direction to withdraw the tube from the coupling and wherein the collet has its arms spaced apart in the circumferential direction such that, in the absence of any tube within the collet, the arms can move radially inwardly to permit the collet to withdraw from said member by axial movement in said one direction.

2. Description of the prior art

One such coupling of the kind is described and claimed in British Patent Specification No. 1520742. This arrangement in which the collet, in the absence of the tube, can be withdrawn from the coupling enables the body member to be a unitary structure yet permits of the collet being removed and hence enables an O-ring or like sealing member inside the coupling to be replaced.

The usual practice has been to make the body members of such couplings of metal. It is an object of the present invention to provide a form of construction which enables the body member to be made out of a plastics material. The collet itself can be made out of plastics material, possibly with a stainless steel insert, as it described for example in British Patent Specification No. 1573757. A coupling formed of plastics material is particularly desirable for use for example in the handling of foodstuffs and beverages.

Heretofore it has not been possible to mould a body member for such a coupling out of plastics material with the required degree of accuracy necessary for making an effective coupling. The reason for this is that the body member essentially has a through-bore which is necessarily narrower at its two ends than is the centre part. Between the centre part of the body member and one end of the bore there must be at least one shoulder to provide a support for a resilient seal member, e.g. an O-ring into which the tube extends when put into the body member from the other end. The tube itself normally abuts against this shoulder or against another abutment. From the shoulder towards said other end, there is the cam surface which has to taper to a narrower diameter in the direction towards said other end.

SUMMARY OF THE INVENTION

This provides a body member for a coupling of the kind described comprising first and second portions, each of plastics material with one male and the other female, each with a bore therethrough and with the bore in the male portion having at least a part increasing in diameter towards that end of the male portion which enters the female portion, the two portions being welded one to the other in two annular regions spaced axially along the length of the male portion lying within the female portion.

DESCRIPTION OF THE PREFERRED EMBODIMENTS

Figure 1:
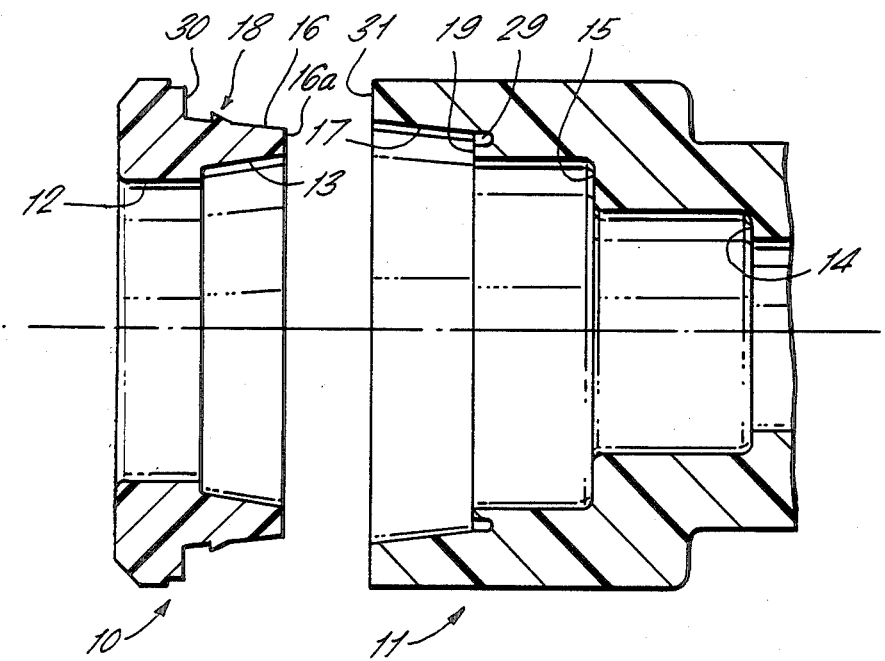
FIG. 1 is a longitudinal section through part of a body member for a coupling formed in two parts with the two parts shown spaced apart before assembly.
Figure 2:
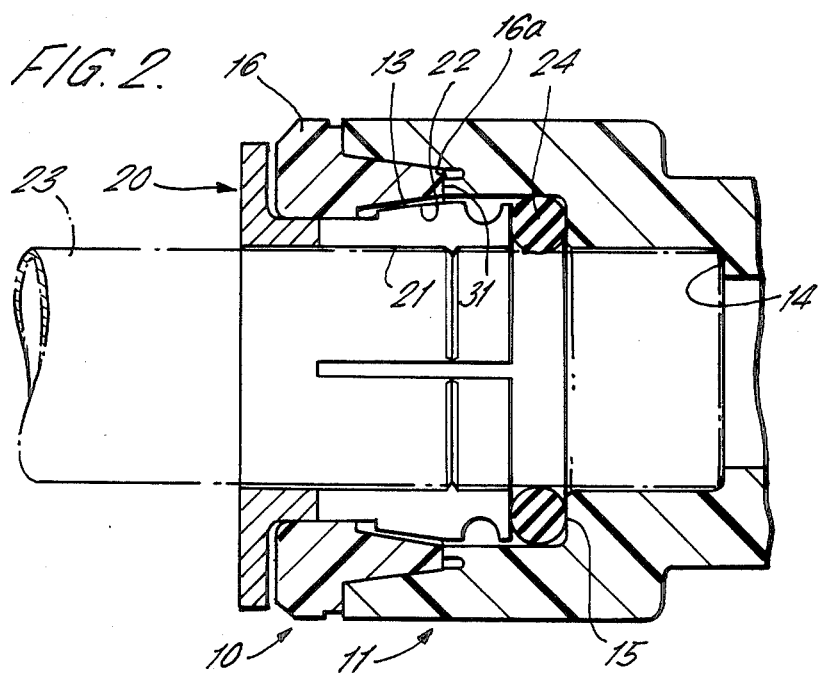
FIG. 2 is a longitudinal section of the assembled coupling including a collet.

Referring to FIG. 1 there is shown a first portion 10, referred to as a cap, and part of a second portion 11, referred to as the body portion, which two portions are to be joined together to form a body member for a coupling of the kind described. The two portions 10,11 constitute the body member of quick release tube coupling of the kind described in the aforementioned United Kingdom Patent Specification No. 1520742. The collet 20 (FIG. 2) may be formed of plastics material, possibly with a stainless steel insert, as described in the specification of United Kingdom Patent Specification No. 1573757. This collet is inserted into the coupling from the left-hand end of the cap member 10 of FIG. 1, the collet arms 21 being movable radially inwardly sufficiently far to permit insertion through the relatively narrow diameter portion 12 of the cap member. These collet arms have bearing portions 22 which engage the tapered surface 13 of the cap member so that, after insertion, outward pull on the collet causes the collet arms to be forced radially inwardly to grip a tube passing through the collet. The tube, shown in chain lines 23 in FIG. 2, is inserted into the coupling through the left-hand end of the member 10 of FIG. 1 and abuts against a shoulder 14 in the body portion 11. A resilient O-ring 24 is provided in this body portion, the tube when inserted passing through the O-ring which is thus supported also by a shoulder 15.

The present invention is concerned more particularly with the construction of the body assembly 10, 11 of the coupling. It will be seen that the two parts 10, 11 are each of generally annular form with an internal bore. The part 10 is a male member having an external conical surface 16 which is shaped to mate with a corresponding internal conical surface 17 in the female part 11. The male member surface 16 tapers towards the axis of the bore at a slightly smaller angle than the angle at which the surface 17 in the female tapers with respect to the axis. At its tapered end, the male member terminates in an end nose 16a.

Around the surface 16 on the male portion 10 is a peripheral projection or rib 18 which is shaped and dimensioned so that it forms the first contact with the female surface 17 on insertion of the male into the female. On the female member, at the inner end of surface 17 is a shoulder 19 with an axially extending groove 29 at the radially outermost edge of the shoulder. The groove 29 constitutes a flash well into which surplus material from the mating surfaces can flow. Alternatively, an annular groove or recess may be provided around the end of the nose 16a of the male member to receive any such surplus material.

Each of the male and female parts 10, 11 is moulded of plastics material, conveniently nylon or an acetyl copolymer, such as that sold under the trade name Kemetal, using conventional moulding techniques with an internal member in the mould dimensioned exactly to define the required shaping and dimensions of the internal bore. In each portion, the internal member of the mould can be withdrawn from one end of the mould after the plastics material has been shaped between internal and external mould members. With this technique, each of these two parts can thus be moulded accurately out of plastics material.

On the male member at the larger diameter end of the external conical surface 16, there is an outwardly directed shoulder 30. Similarly, on the female member at the radially outermost end of the conical surface 17, there is an axially facing shoulder 31 which faces the shoulder 30 on the male.

The two parts 10, 11 of the coupling body are put together so that the rib 18 on the male comes into contact with the conical surface 17 on the female and then ultrasonic vibrations are applied to cause relative motion of these two parts in the axial direction. This causes rubbing of the rib 18 on the conical surface 17 with softening of the rib and the contacting surface region. The male can then enter further into the female until the nose end 16a of the male contacts the shoulder 19 so causing softening of the material in this region with surplus material forced into the groove 29. Abutment of the shoulders 30, 31 prevents further penetration. The male and female portions are thus welded together in two spaced annular regions, one arising from the rib 18 rubbing on surface 17 and the other where the nose of the male member abuts shoulder 19. This welding gives a fluid-tight seal between the portions 10, 11 with welding occurring at the innermost end of the male, thereby avoiding any undesirable cracks or crevices which are undesirable particularly if the coupling is to be used for beverages or the like.

Externally, the shoulders 30, 31 are brought into abutment and, with the above-described technique, they can readily be made accurately and will fit very closely so avoiding any external checks or crevices in the finished assembly.

The ultrasonic welding of the two parts 10, 11 thus joins these parts to form a unitary body structure which has internal dimensions, in particular of the tapered portion 13 which are accurately determined during the moulding operations of the separate parts 10, 11. The close fit and welding together of the two parts 10, 11 prevents any possibility of seepage of a fluid from the coupling after the two parts have been joined. After the two parts have been joined, the O-ring 24 is inserted and then the collet 20, as seen in FIG. 2, to form the complete coupling.

It will be noted that the rib 18, provided in the male conical surface ensures that there is a complete annular region of softened plastics material to form a weld between the male and female conical surfaces. This annular region is located a short distance away from the inner end of the female conical surface. Particularly for small members, it may be sufficient, instead of providing a rib 18, to rely on the contact, with the female surface, of the edge formed between the nose and surface of the male member and the conical surface of that member. Provided the nose of the male member is of larger diameter than the inner end of the female conical surface, the male member will make initial contact with the female conical surface a short distance from the inner end of the female conical surface, this edge on the male member acts in the same way as the rib 18 to form an annular region of softened plastics material which permits further inward movement of the male member and which constitutes an annular weld. The further inward movement is limited by abutment of the male nose on a shoulder in the female member or abutment of a shoulder on the male against an outer end or shoulder on the female; in either case the abutment will give, due to the ultrasonic vibrations, a second annular weld region.

I claim:

1. A body member for a quick release tube coupling including a collet with resilient arms disposed in the body member to receive a tube, the body member having a cam surface for engaging the collet arms to force the arms radially inwardly to engage and grip the tube in the collet, the body member comprising interfitting male and female body portions comprised of plastic material;

the female body portion having an end face, a tapered bore to receive the male body portion which extends into the female body portion from said end face, and a step encircling the bore and facing towards said end of the female body portion, the tapered bore terminating in the step, the male body portion having a tapered bore to provide the cam surface for engaging the resilient arms of the collet, and a conical external surface with a larger end terminating in an outwardly extending annular abutment and a narrower end including an inwardly extending abutment face;

a first annular ultrasonic weld located between the tapered bore in the female body and the conical surface of the male body portion at a position spaced apart from the narrower end of the male body portion; and a second annular ultrasonic weld located between the abutment face at the narrower end of the male body portion and the step encircling the tapered bore in the female body portion.

2. A body member as claimed in claim 1, wherein the abutment face at the narrower end of the male body portion has an outer diameter larger than the inner diameter of the step encircling the bore of the female body portion.

3. A body member for a quick release tube coupling including a collet with resilient arms disposed in the body member to receive a tube, the body member having a cam surface for engaging the collet arms to force the arms radially inwardly to engage and grip the tube in the collet, the body member comprising interfitting male and female body portions comprised of plastic material;

the female body portion having an end face, a tapered bore to receive the male body portion which extends into the female body portion from said end face, and a step encircling the bore and facing towards said end of the female body portion, the tapered bore terminating in the step, the male body portion having a tapered bore to provide the cam surface for engaging the resilient arms to the collet, and a conical external surface with a larger end terminating in an outwardly extending annular abutment and a narrower end including an inwardly extending abutment face;

the external conical surface of the male body portion having a taper angle, and the internal conical bore of the female body portion having a taper angle, and the taper angle of the male body portion being less than the taper angle of the female body portion;

a first annular ultrasonic weld located between the narrower end of the male body portion and the step and adjacent part of the bore in the female body portion; and a second annular ultrasonic weld located between the outwardly extending annular abutment at the larger end of the male body portion and the end face of the female body portion.

4. A body member as claimed in claim 3, wherein the abutment face at the narrower end of the male body portion has an outer diameter larger than the inner diameter of the step encircling the bore of the female body portion.

* * * * *